(12) United States Patent  (10) Patent No.: US 7,857,348 B2
Fleming  (45) Date of Patent: Dec. 28, 2010

(54) MULTI-FUNCTION CROSS MEMBERS FOR TRUCK FRAMES

(75) Inventor: Sean M. Fleming, Buchanan, VA (US)

(73) Assignee: Metalsa Servicios S de RL (MX)

( * ) Notice: Subject to any disclaimer, the term of this patent is extended or adjusted under 35 U.S.C. 154(b) by 497 days.

(21) Appl. No.: 11/758,720

(22) Filed: Jun. 6, 2007

(65) Prior Publication Data

US 2008/0007096 A1 Jan. 10, 2008

Related U.S. Application Data

(60) Provisional application No. 60/811,869, filed on Jun. 8, 2006.

(51) Int. Cl.
*B62D 21/00* (2006.01)
(52) U.S. Cl. ..................................... 280/781
(58) Field of Classification Search ................. 280/781, 280/785, 788, 789, 796, 799, 800, 782, 124.116, 280/124.157; B62D 21/00, 21/02, 21/08
See application file for complete search history.

(56) References Cited

U.S. PATENT DOCUMENTS

| | | | |
|---|---|---|---|
| 2,009,963 A * | 7/1935 | Matthaei ..................... 280/796 |
| 2,192,560 A * | 3/1940 | Riemenschneider ........ 280/796 |
| 3,720,087 A | 3/1973 | Gottschli |
| 4,006,617 A | 2/1977 | Foster |
| 4,142,923 A | 3/1979 | Satava |
| 4,929,018 A * | 5/1990 | Carty ......................... 296/204 |
| 5,855,394 A | 1/1999 | Horton et al. |
| 6,189,930 B1 | 2/2001 | Kalazny |
| 6,240,820 B1 | 6/2001 | Sturrus et al. |
| 6,283,538 B1 * | 9/2001 | Reitnouer ................. 296/184.1 |
| 6,345,425 B1 | 2/2002 | Rosasco et al. |
| 6,360,441 B1 | 3/2002 | Himsl et al. |
| 6,488,791 B1 | 12/2002 | Powers, II |
| 6,523,876 B1 * | 2/2003 | Durand ....................... 296/35.1 |
| 6,681,489 B1 | 1/2004 | Fleming |
| 2004/0239091 A1 * | 12/2004 | Horton et al. ............... 280/781 |

* cited by examiner

*Primary Examiner*—Paul N Dickson
*Assistant Examiner*—Robert A. Coker
(74) *Attorney, Agent, or Firm*—Andrus, Sceales, Starke & Sawall, LLP

(57) ABSTRACT

A frame for a vehicle chassis includes C-cross section side rails and interconnecting cross members which extend through the vertical webs of the side rails and are attached with connecting brackets to the outside faces thereof. This construction provides the capability of utilizing extended length cross members to which other vehicle components, such as fuel tanks, suspension members, fenders and the like, may be attached.

10 Claims, 4 Drawing Sheets

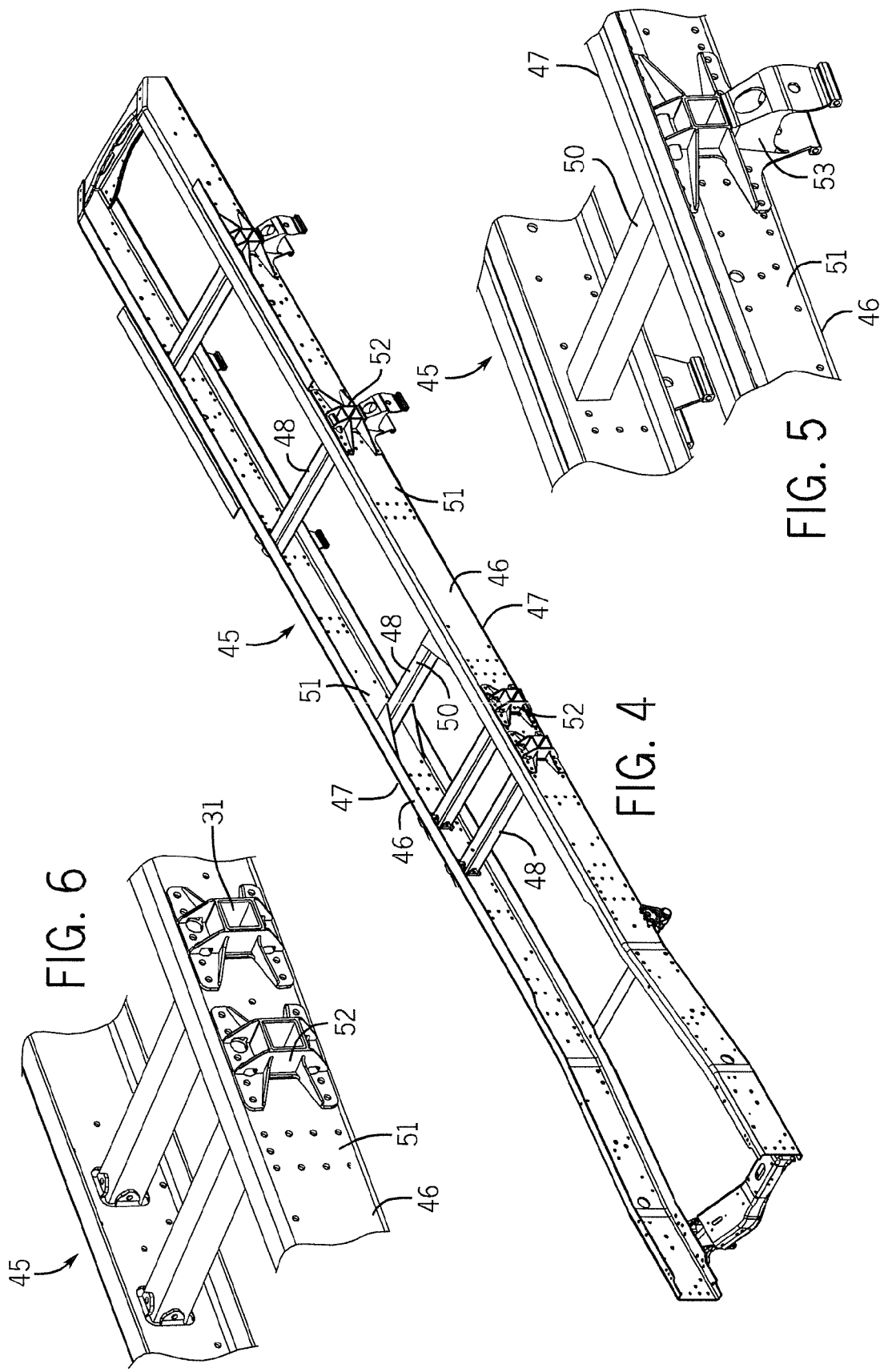

MULTI-FUNCTION CROSS MEMBERS FOR TRUCK FRAMES

CROSS REFERENCE TO RELATED APPLICATION

This application claims priority to U.S. Provisional Patent Application Ser. No. 60/811,869, filed Jun. 8, 2006.

BACKGROUND OF THE INVENTION

The present invention relates to frames for heavy trucks and, more particularly, to special multi-function cross members that are used to connect the frame side rails and to provide attachment for other vehicle equipment.

In order to meet federally mandated vehicle emission requirements, truck manufacturers have had to use larger cooling packages and exhaust systems. In addition to the added cost, these changes also add significantly to the vehicle weight and, as a result, to reduced fuel efficiency. Therefore, there is a great emphasis on weight reduction in all vehicle components.

SUMMARY OF THE INVENTION

Heavy duty truck frames are typically fabricated from steel channel section members that are used for the main side rail pair, as well as for the connecting cross members and connecting brackets (if brackets are used). The channel members may be made of either heat treated steel or high strength low alloy (HSLA) steel. Although side rails may be interconnected by the cross members using welded connections, more typically mounting brackets are used to facilitate bolted connections between side rails and the cross members. It is well known that the side rail flanges provide most of the side rail stiffness in the vertical direction, which stiffness is the primary strength requirement in truck frames. Because the web that connects the flanges has far less effect on vertical stiffness, it has recently been proposed to remove material from the web without significantly decreasing the vertical stiffness of the side rail.

In accordance with the present invention, heavy truck frame side rails are connected with cross members that extend through the side rail webs and are attached thereto with a mounting bracket that also functions to mount other truck components or equipment. The cross members may utilize conventional channel section members or, preferably, the cross members are square section tubular members. The side rails may be conventional channel sections or may utilize weight saving concepts that remove significant amounts of material from the side rail web. Such side-rail concepts are described in more detail in copending application Ser. No. 11/734,904, filed Apr. 13, 2007, the disclosure of which is incorporated by reference herein.

BRIEF DESCRIPTION OF THE DRAWINGS

FIGS. 1-4 are perspective views of three different heavy truck frames utilizing multi-function cross bars of the present invention.

FIGS. 5 and 6 are details of the truck frame of FIG. 4 showing multi-function mounting brackets of the present invention.

DETAILED DESCRIPTION OF THE PREFERRED EMBODIMENTS

Figure 1:
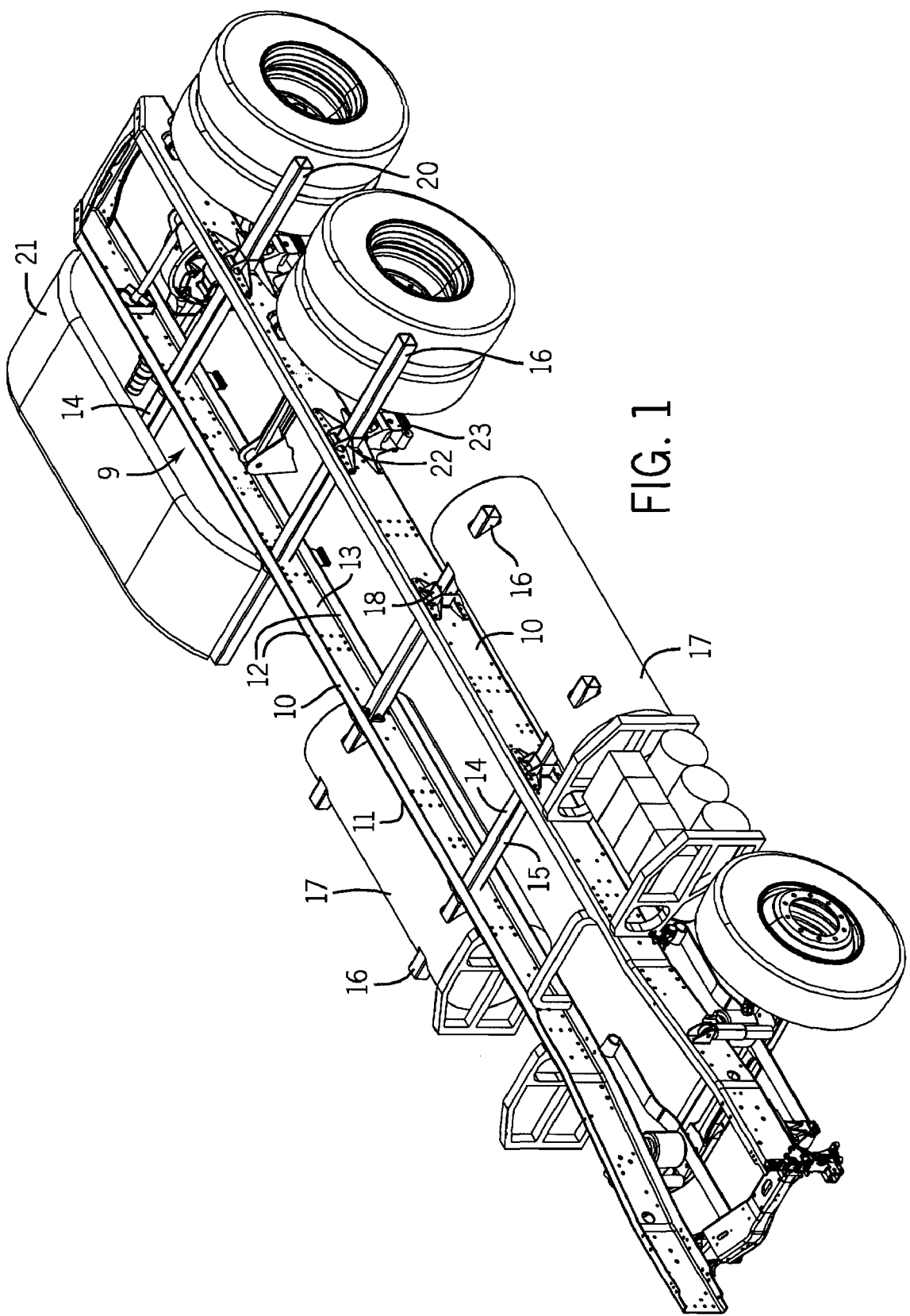

FIG. 1 shows a heavy truck frame 9 using conventional C-section channels 10 for the side rails 11. Each channel section 10 includes horizontal upper and lower flanges 12 connected by a central web 13. The main cross members 14 connecting the side rails 11 comprise tubular steel members 15 having a square cross section. For each cross member 14, the webs 13 of the side rails 11 are pierced to form a square hole for receipt of the cross member 14.

As is shown in the drawing, each cross member 14 extends a significant distance beyond the outer face of the side rail web 13. The extended ends 16 of the cross members 14 may be used to support a variety of different truck components. For example, the mid-frame cross members are shown supporting a pair of fuel tanks 17.

Each cross member 14 is secured to the web 13 through which it extends with a mounting bracket 18 on the outer face of the web 13. Each mounting bracket is attached to the web 13 and to the cross member 14, preferably with bolted connections. The mounting bracket 18 may be fabricated from steel, but preferably comprises a casting made either of iron or steel.

At the rear end of the frame 9, cross members 14 having even longer extended ends 20 are used to support the fender and mud flap assemblies 21. In addition, the rear mounting brackets 22 which secure the cross members to the side rail webs 13 are made to also function to support the rear spring assemblies 23. This dual function for the mounting brackets 18 eliminates the need for separate rear spring hanger brackets.

Figure 2:
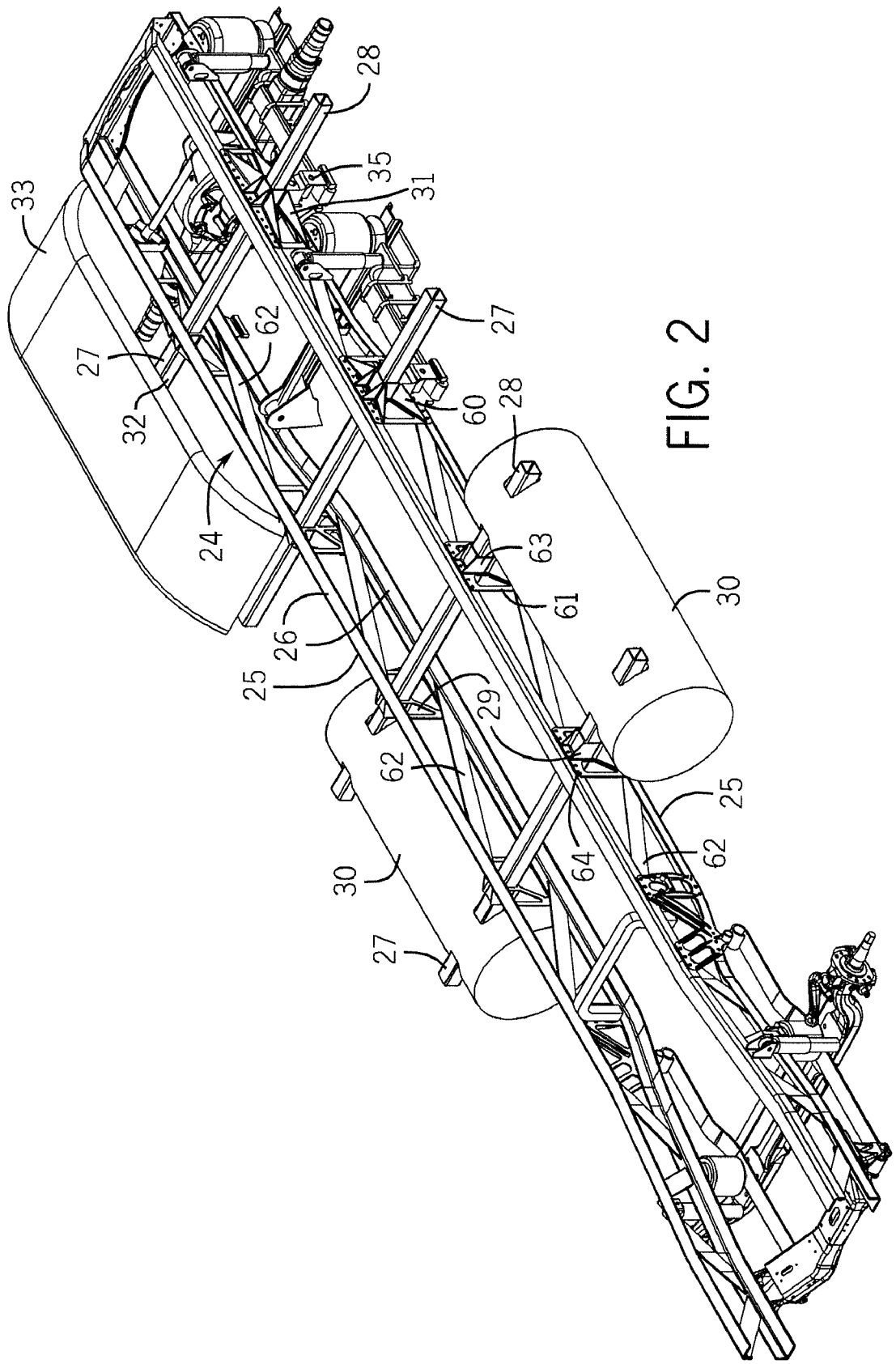

Referring to FIG. 2, there is shown a truck frame 24 in which each of the sided rails 25 comprises a pair of upper and lower angle sections 26, instead of a more conventional channel member. In other words, the space normally occupied by the web of a conventional C-section channel member is eliminated in the side rails 25. The horizontal flanges of the angle sections 26 provide the side rail flanges which, as indicated previously, are largely responsible for the vertical stiffness of the side rails. The vertical flanges of the angle sections 26 are utilized to connect the cross members 27 which may be identical to the cross members 14 used in the FIG. 1 frame. Thus, the mid-frame cross members 27 have extended ends 28 which are used to support fuel tanks 30. The cross members 27 are secured to the side rail angle sections 26 with mounting brackets 29 that can be similar to the mounting brackets 28 of the FIG. 1 embodiment.

In a manner similar to the FIG. 1 embodiment, the cross members have even longer extended ends 32 used to support fender and mud flap assemblies 33. The rear mounting brackets 31 may be used to help secure the fender assemblies to the frame and may also provide support for the rear spring assemblies 35 or other components.

The mounting bracket 31, as also shown in FIG. 6, may comprise a unitary casting 60 having a square through hole for receipt of a square section cross member 27. The bracket includes integral upper and lower plates 61 that attach directly to the vertical flanges of the side rail sections 26. Each mounting bracket casting 60 includes a central horizontal sleeve 63 sized to receive the end of the tubular cross member 27, and plates 61 in the form of a peripheral flange 64 that lies against and is attached to a side face of the central web 13. It may also be desirable to make the side rails more rigid by interconnecting the upper and lower angle members with diagonal struts 62.

Figure 3:
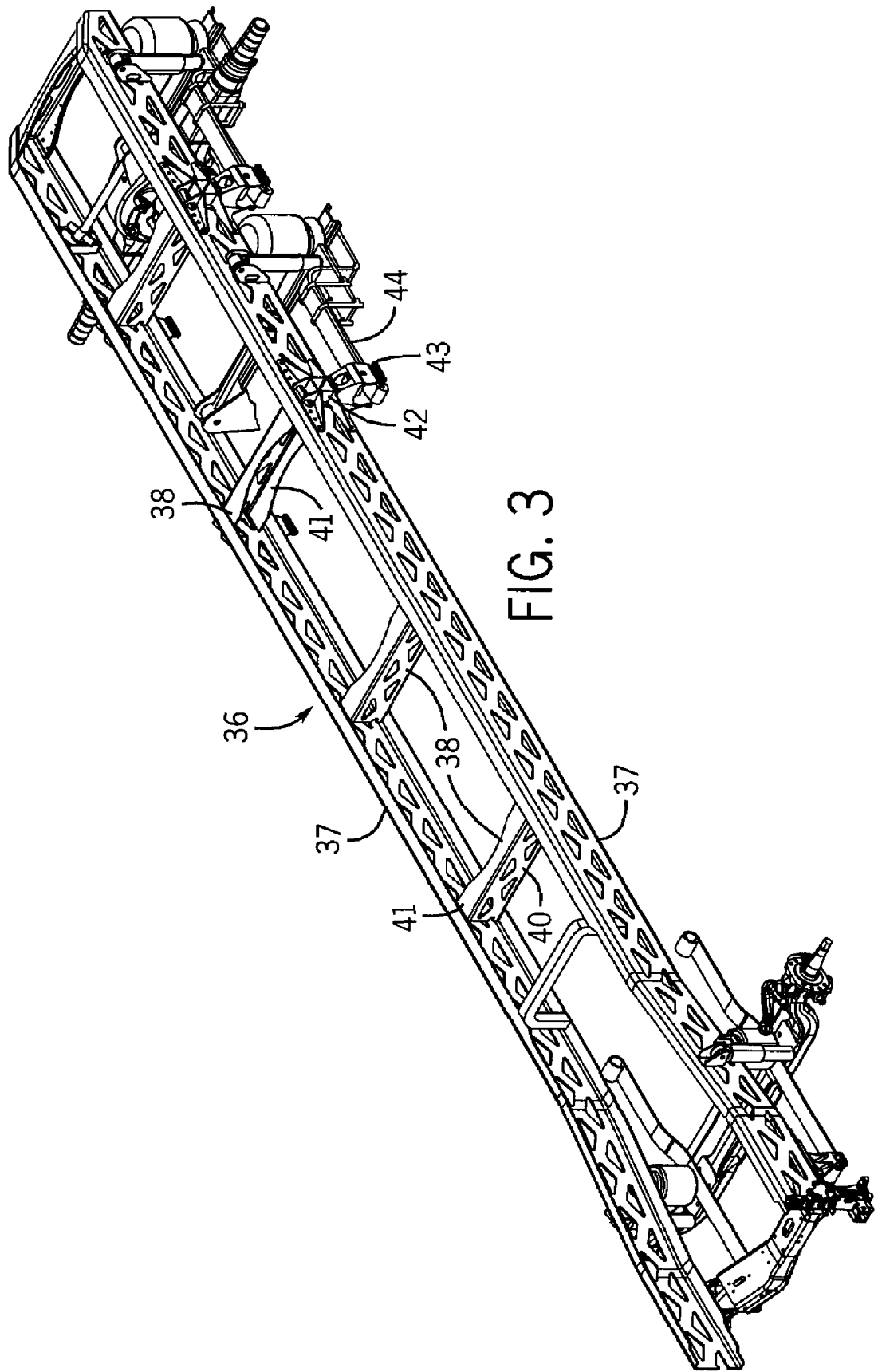

In FIG. 3, there is shown a further embodiment of the invention applied to a truck frame 36 in which the side rails 37 are formed with an expanded metal construction by stretching a pre-slit blank transversely to the slits, resulting in a channel member with an open web construction as shown. The cross members 38 also have a similar expanded web configuration including an open web 40 interconnecting upper and lower flanges 41.

Referring to the rearmost cross members 38 in FIG. 3, the cross members 38 may be attached to the side rails 37 with mounting brackets 42 and bolted connections in a conventional manner. However, mounting brackets 42 may also be configured to attach to the side rails 37 from the outside and to include an outer mounting structure 43 for direct connection of the rear spring assemblies 44 or other chassis components.

The frame assembly 45 shown in FIG. 4 is similar to the FIG. 1 frame. Frame assembly 45 includes C-section channels 46 for the side rails 47 with square section tubular members 48 as the primary cross members 50 interconnecting the side rails 47. The side rail webs 51 are pierced to receive the ends of the cross members 50. Rigid connections between the side rails 47 and the cross members 50 are provided with cast brackets 52 that fit over the outer ends of the cross members 50 and are bolted thereto and to the outside faces of the side rail webs 51. These brackets 52 are shown in greater detail in FIG. 6. Although the cast brackets 52 serve only a frame connecting function, FIG. 5 shows a modified bracket 53 used at the rear of the frame to provide both the frame connection function and as a mounting bracket for the rear truck suspension. This arrangement provides a weight saving as well as an overall simplification in the assembly of the frame. As indicated previously, because the webs 51 of the side rail channels 46 have negligible effect on vertical frame stiffness, piercing the webs to provide holes for the tubular cross members 50 can be done without significantly decreasing side rail stiffness.

I claim:

1. A frame for a vehicle chassis comprising:
   a pair of generally parallel side rails, each side rail having vertically spaced upper and lower angle members, each member having a horizontal flange and a vertical flange;
   a cross member extending laterally between the side rails and through a space between the upper and lower angle members;
   mounting brackets securing the cross member to the outsides of the vertical flanges of the upper and lower angle members;
   the ends of the cross member carrying additional vehicle components; and
   each of said mounting brackets comprising a unitary casting having upper and lower plates connected to the vertical flanges of the upper and lower angle members.

2. The frame as set forth in claim 1 wherein the cross member comprises a tubular member having a rectangular cross section.

3. The frame as set forth in claim 2 wherein the cross member has a square cross section.

4. The frame as set forth in claim 1 including angularly disposed struts interconnecting the upper and lower angle members.

5. A frame for a vehicle chassis comprising:
   a pair of generally parallel side rails comprising C-section channel members including upper and lower horizontal flanges interconnected by a vertical web;
   cross members comprising tubular members having generally square cross sections, said tubular members extending transversely to the side rails and through square holes in the side rail webs to provide tube ends extending beyond the side webs;
   mounting brackets each having a central horizontal sleeve for receipt of a tube end and a vertical flange adapted to engage the outside face of said web; and,
   connectors for securing the bracket sleeve to the tube and the bracket flange to the web.

6. The frame as set forth in claim 5 wherein the connectors comprise bolted connections.

7. The frame as set forth in claim 5 wherein the ends of the tubular cross members extend beyond the mounting brackets and carry thereon additional vehicle components.

8. The frame as set forth in claim 5 wherein the mounting brackets carry thereon additional vehicle components.

9. A frame for a vehicle chassis comprising:
   a pair of generally parallel side rails having spaced upper and lower horizontal flanges and means for rigidly interconnecting said flanges;
   tubular cross members extending transversely to the side rails and through spaces between the upper and lower horizontal flanges to provide tube ends extending laterally beyond the side rails;
   mounting brackets on the outsides of said interconnecting means connecting the cross members to the side rails;
   wherein the upper and lower horizontal flanges comprise the legs of angle members and the interconnecting means comprises the mounting brackets attached to the vertical legs of said angle members; and
   wherein the interconnecting means further comprises supplemental struts.

10. The frame as set forth in claim 9 wherein the interconnecting means comprises an integral vertical web.

* * * * *